United States Patent
You

(10) Patent No.: US 7,578,717 B2
(45) Date of Patent: Aug. 25, 2009

(54) LAMP APPARATUS FOR LIQUID CRYSTAL DISPLAY

(75) Inventor: Dong Jae You, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 70 days.

(21) Appl. No.: 11/003,395

(22) Filed: Dec. 6, 2004

(65) Prior Publication Data

US 2005/0093419 A1    May 5, 2005

Related U.S. Application Data

(62) Division of application No. 10/025,911, filed on Dec. 26, 2001, now Pat. No. 7,427,828.

(30) Foreign Application Priority Data

Dec. 30, 2000  (KR)  ............. 10-2000-0087048

(51) Int. Cl.
    *H01J 5/50*  (2006.01)
(52) U.S. Cl. ............ 445/23; 313/318.01; 313/318.12
(58) Field of Classification Search ............. 313/318, 313/318.01, 318.12, 234; 439/226–244, 439/619; 445/23
    See application file for complete search history.

(56) References Cited

U.S. PATENT DOCUMENTS

| 2,945,206 | A | * | 7/1960 | Hammell | 439/881 |
| 3,002,126 | A | * | 9/1961 | Noir | 315/58 |
| 3,771,111 | A | | 11/1973 | Pritulsky | |
| 4,181,390 | A | | 1/1980 | Aizawa | |
| 4,680,505 | A | * | 7/1987 | Funada et al. | 313/558 |
| 4,752,241 | A | * | 6/1988 | Matsuoka et al. | 439/619 |
| 4,804,343 | A | * | 2/1989 | Reedy | 439/854 |
| 4,906,891 | A | * | 3/1990 | Takagi et al. | 313/318.02 |
| 4,949,007 | A | * | 8/1990 | Takagi et al. | 313/318.02 |
| 4,957,455 | A | * | 9/1990 | Horiuchi et al. | 439/548 |
| 5,035,643 | A | * | 7/1991 | Forish et al. | 439/358 |
| 5,035,655 | A | * | 7/1991 | Hesse | 439/699.2 |
| 5,087,213 | A | * | 2/1992 | Drapcho et al. | 439/672 |
| 5,105,119 | A | * | 4/1992 | Dayton | 313/318.01 |
| 5,509,828 | A | * | 4/1996 | Muta et al. | 439/699.2 |
| 5,757,110 | A | * | 5/1998 | Motiduki et al. | 313/25 |
| 6,799,987 | B1 | * | 10/2004 | Park et al. | 439/375 |
| 2001/0006459 | A1 | * | 7/2001 | Okumura | 362/31 |

FOREIGN PATENT DOCUMENTS

| JP | 07-029651 | 1/1995 |
| JP | 09-007686 | 1/1997 |

* cited by examiner

*Primary Examiner*—Nimeshkumar D. Patel
*Assistant Examiner*—Christopher M Raabe
(74) *Attorney, Agent, or Firm*—McKenna Long & Aldridge

(57) ABSTRACT

A lamp apparatus for a liquid crystal display that is capable of preventing a wire breakage of the lamp apparatus. In the apparatus, a lamp causes a discharge by a voltage applied from a power terminal to generate light. A wire is supplied with the voltage. A connector electrically connects the power terminal of the lamp to the wire using a pressing. The power terminal of the lamp and the wire electrically connected to each other and the connector are integrated.

3 Claims, 5 Drawing Sheets

LAMP APPARATUS FOR LIQUID CRYSTAL DISPLAY

This application is a divisional of application Ser. No. 10/025,911, filed Dec. 26, 2001 now U.S. Pat. No. 7,427,828, which claims priority to Korean Patent Application No. 2000-87048, filed Dec. 30, 2000, each of which are incorporated by reference for all purposes as if fully set forth herein.

This application claims the benefit of Korean Patent Application No. P2000-87048, filed on Dec. 30, 2000, which is hereby incorporated by reference for all purposes as if fully set forth herein.

BACKGROUND OF THE INVENTION

1. Field of the Invention

This invention relates to a liquid crystal display, and more particularly to a lamp apparatus for a liquid crystal display that prevents wire breakage within the lamp apparatus.

2. Description of the Related Art

Generally, a liquid crystal display (LCD) is widely used as a display device in notebook personal computers or portable televisions. LCDs typically include an upper substrate, a lower substrate, a liquid crystal display panel with a liquid crystal layer provided between the upper substrate and the lower substrate, and a back light installed at the lower side of the lower substrate to provide the liquid crystal display panel with an uniform surface light source.

The LCD requires a back light unit because it is not a self-emitting display device. The back light unit includes a lamp apparatus that generates light as shown in FIG. 1.

Referring to FIG. 1, a conventional lamp apparatus for the LCD includes a lamp 2, a wire 3 for supplying the lamp 2 with power, solder 4 for electrically contacting the lamp with the wire 3, a shrinking tube 10 for enclosing the wire 3 and the solder 4, and a lamp holder 5 for enclosing an end of the lamp 2 and the solder 4.

The lamp 2 receives driving power from a power source (not shown) to generate light. Driving power is fed to the lamp 2 by way of the wire 3. To this end, the wire 3 and the lamp 2 are electrically connected to each other by a soldering method using a lead.

The shrinking tube 10 is manually provided to enclose the wire 3, the solder 4, and the end of the lamp 2 to carry out a voltage-resistance test and to prevent wire breakage within the lamp apparatus. The lamp holder 5 encloses the tube 10 and the end of the lamp 2 so as to protect the soldering portion 4 from an external impact. The lamp holder 5 is made from a material such as soft rubber.

Referring to FIGS. 2A-2D, an assembly method of the abovementioned conventional lamp apparatus for the LCD will now be described. As shown in FIG. 2A, a lead forming a solder pad 12 is electrically contacted to the lamp 2 and the solder 4 is placed on the solder pad to form a solder bump. Referring to FIGS. 2B and 2C, a wire electrode 13 is formed to electrically contact the wire 3 and, upon heating the solder 4, is pressed into the solder 4 such that the lamp 2 is in electrical communication with the wire 3. Subsequently, the shrinking tube 10 is formed to enclose the wire 3 and the solder 4. The lamp holder 5 is then fitted over the end of the wire 3 and the edge of the lamp 2 as shown in FIG. 3. The lamp holder 5 allows the lamp 2, the solder 4 and the wire 3 to be integrated.

The LCD lamp apparatus formed using the conventional soldering method is then subjected to a wire breakage test: During the breakage test, the wire 3 is shaken about 50 to 60 times in the left and right directions repeatedly as indicated in the bilateral arrow 'B' in FIG. 3. An external force according to such a breakage test is transferred into the end portion 'A' of the wire 3 and the solder 4 to break the wire 3. The wire 3 breaks because the lamp holder 5, which encloses the lamp 2, the solder 4, and the wire 3, is not completely attached to the lamp 2, the solder 4, and the wire 3.

Wire breakage is a problem because driving power cannot be fed to the lamp 2. Hence, the lamp 2 cannot be turned on. Another problem arises because the solder 4, the shrinking tube 10, and the lamp holder 5 must be assembled manually. It has been found that manual assembly produces low yields in the fabrication process.

SUMMARY OF THE INVENTION

Accordingly, the present invention is directed to a lamp apparatus for liquid crystal display that substantially obviates one or more of the problems due to limitations and disadvantages of the related art.

Accordingly, it is an advantage of the present invention to provide a lamp apparatus of a liquid crystal display that is capable of preventing breakage a wire in a lamp apparatus of an LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, a lamp apparatus for a liquid crystal display according to one embodiment of the present invention includes a lamp capable of using a discharge of an external voltage applied to a lamp electrode to generate light; a wire to deliver said voltage; a connector for electrically connecting the lamp electrode of the lamp to the wire by pressing wings of the connector around electrodes of the lamp and the wire; and unifying means for integrally forming the lamp electrode of the lamp and the wire electrically connected to each other and the connector.

In the lamp apparatus, the connector includes a first wing into which the lamp electrode of the lamp is inserted and pressed; and a second wing into which the wire electrode is inserted and pressed.

The unifying means is an injection-molded product and unifies the end of the lamp, the connector, and the wire.

The injection-molded product is made from a material selected from any one of plastic and silicon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, example of which is illustrated in the accompanying drawings.

Figure 1:
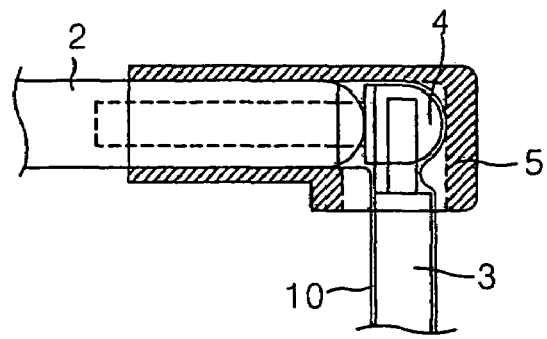
FIG. 1 is a sectional view showing a conventional lamp apparatus for a liquid crystal display employing a soldering method.
Figure 2A:
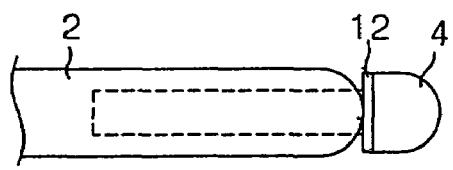
FIG. 2A to FIG. 2D are sectional views showing an assembly sequence of the conventional lamp apparatus for the liquid crystal display.
Figure 2B:
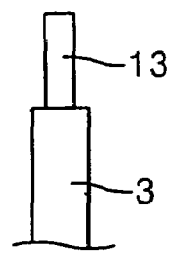
Figure 2C:
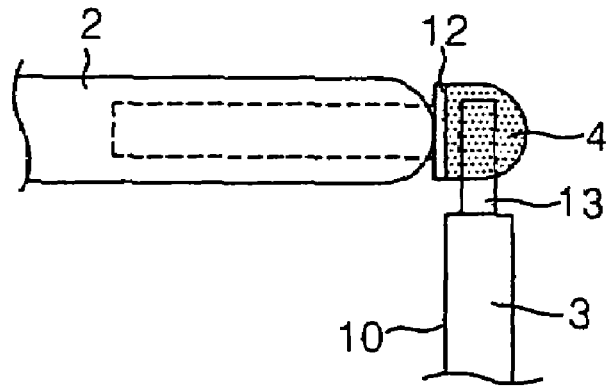
Figure 2D:
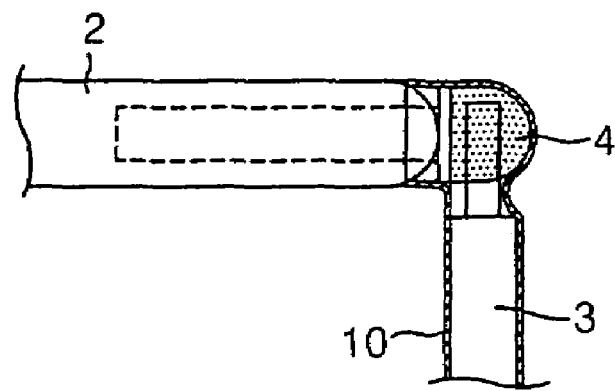
Figure 3:
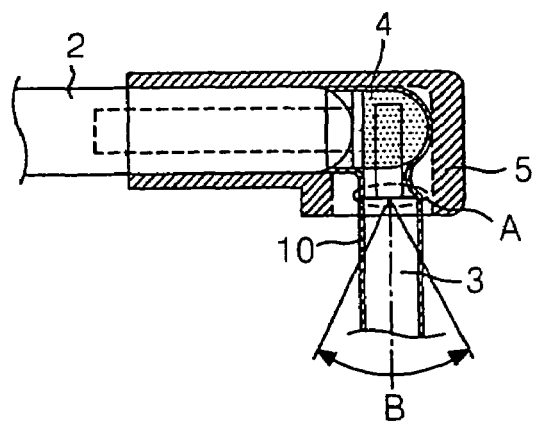
FIG. 3 is a sectional view representing a portion into which an external force is transferred upon a breakage test of the conventional lamp apparatus for the liquid crystal display.
Figure 4:
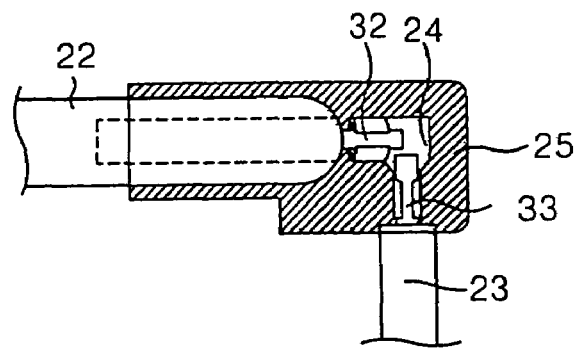
FIG. 4 is a sectional view showing a structure of a lamp apparatus for a liquid crystal display according to an embodiment of the present invention.

Referring to FIG. 4, there is shown a lamp apparatus for a liquid crystal display according to an embodiment of the present invention. The lamp apparatus includes a lamp 22 for generating light, a wire 23 for conducting external electric power to the lamp 22, a connector 24 for electrically connecting the lamp 22 to the wire 23, and a lamp holder 25, for enclosing the connector 24, the end of the lamp 22, and the wire 23.

The lamp 22 receives driving power from a power source (not shown) to generate light. The driving power is fed to the lamp 22 through the wire 23. The wire 23 and the lamp 22 are pressed into and thereby attached to the connector 24, without the use of any solder using a lead, and are thereby electrically connected to each other.

Figure 5:
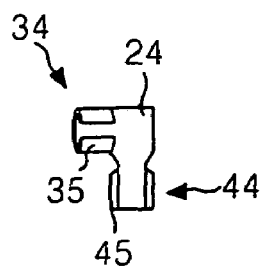
FIG. 5 is a detailed sectional view of the connector shown in FIG. 4.

As shown in FIG. 5, the connector 24 is provided in a substantially "L" shape that includes a first receiving part 34 to be pressed around lamp electrode 32 and a second receiving part 44 to be pressed around a wire electrode 33 such that the lamp 22 is in electrical contact with the wire 23. The first and second receiving parts 34 and 44 are provided with first and second wings 35 and 45, respectively, that extend from a side of the connector to form curvature and a space capable of receiving the lamp electrode 32 and wire electrode 33.

The lamp electrode 32, provided at the end of the lamp 22, is pressed into the first wing 35 of the first receiving part 34 with the aid of a gig (not shown). Thus, the first wing 35 is connected to the lamp electrode 32 to electrically connect the lamp electrode 32 to the connector 24. Further, the wire electrode 33, provided at the end of the wire 23, is pressed into the second wing 45 of the second receiving part 44 with the aid of a gig (not shown). Thus, the second wing 45 is connected to the wire electrode 33 to electrically connect the wire electrode 33 to the connector 24.

The connector 24 is made from a material having excellent electrical conductivity. Accordingly, the lamp 22 is in electrical contact with the wire 23 because the lamp 22 and the wire 23 are connected to the connector 24. Accordingly, lamp driving voltage may be applied to the lamp 22 from the wire 23 via the connector 24. Alternatively, the connector 24 may have a different shape depending on a position between the wire 23 and the lamp 22 rather than limited to the substantially "L" shape.

An injection mold (not shown) is used to inject material to form the lamp holder 25 around the end of the lamp 22 and the end of the wire 23. In this case material such as silicon, plastic, or plastic powder, etc. is used as a material for the injection. The lamp holder 25 encloses the end of the lamp 22 and the end of the wire 23 and protects the lamp 22 and the wire 23, electrically connected to each other via the connector 24, from external impacts. The end of the lamp 22 is thus integrated with the end of the wire 23 using such an injection material. Accordingly, motion of the lamp 22 and the wire 23, connected to each other by means of the connector 24, is prevented.

An assembly method for the lamp apparatus of the liquid crystal display according to an embodiment of the present invention is provided with reference to FIG. 6A to FIG. 6C below.

Figure 6A:
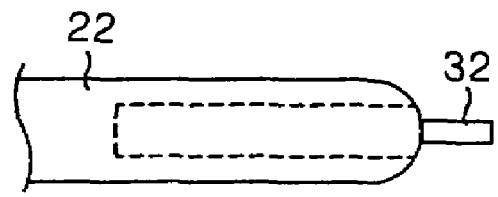
FIG. 6A to FIG. 6C are sectional views showing an assembly sequence of the lamp apparatus for the liquid crystal display according to the embodiment of the present invention.
Figure 6B:
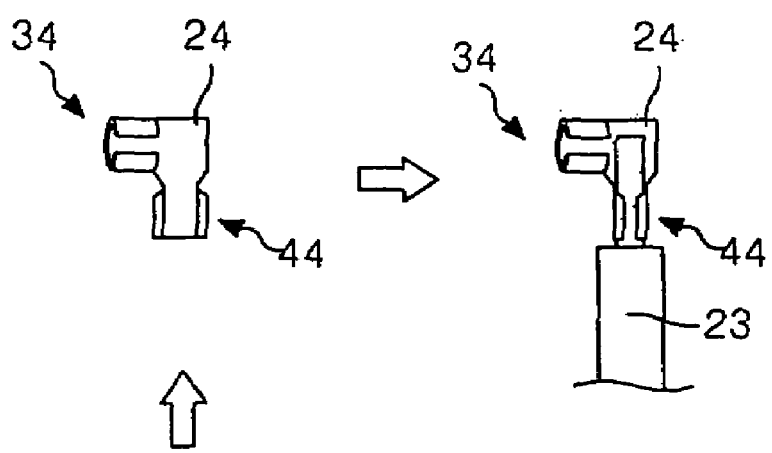
Figure 6B:
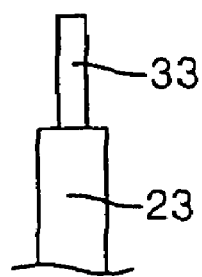
Figure 6C:
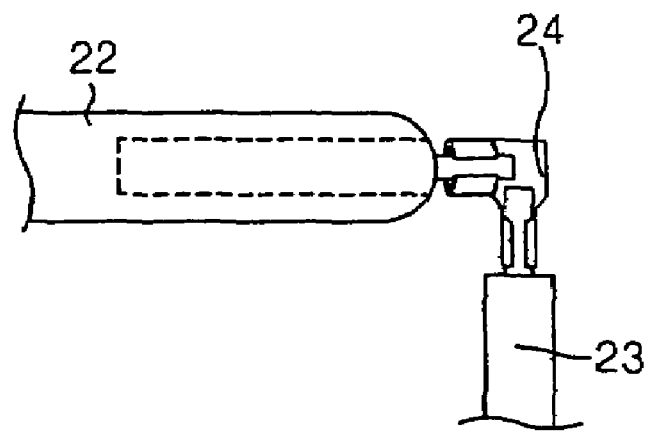

First, the end of the lamp 22 to be attached to the first receiving part 34 of the connector 24 is configured as shown in FIG. 6A to form the lamp electrode 32. Further, a coating on the end of the wire 23 to be attached to the second receiving part 44 of the connector 24 is stripped to form the wire electrode 33 as shown in FIG. 6B.

Next, the wire electrode 33 is positioned proximate the second receiving part 44 of the connector 24 and pressed into the connector 24 with the aid of a type of a binder known as a gig (not shown). Further, the lamp electrode 32 is positioned proximate the first receiving part 34 of the connector 24 and then pressed into the connector 24 using the gig. Thus, the lamp 22 and the wire 23 are electrically connected to each other via the connector 24 as shown in FIG. 6C.

Subsequently, an injection is performed using an injection mold (not shown) for the purpose of integrating the lamp 22 and the wire 23, electrically connected to each other by means of the connector 24. Thus, the lamp 22, the connector 24 and the wire 23 are united as shown in FIG. 4 by means of the lamp holder 25 provided by the injection.

A wire breakage test is then carried out on the lamp 22 and wire 23, connected to each other by means of the connector 24.

Figure 7:
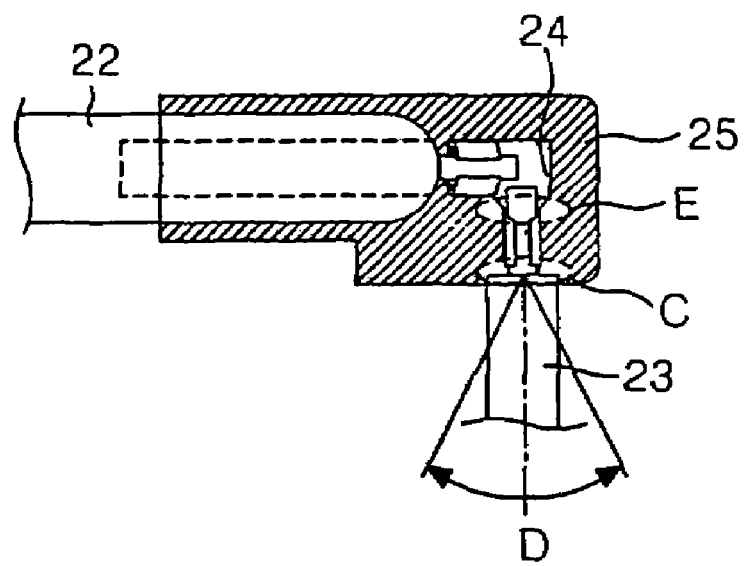
FIG. 7 is a sectional view representing a portion into which an external force is transferred upon breakage test of the lamp apparatus for the liquid crystal display according to the embodiment of the present invention.

Upon performing the breakage test, the wire 23 is shaken approximately 50 to 60 times in the left and right directions repeatedly as indicated in the bilateral arrow 'D' in FIG. 7. A typical external force created during such a breakage test is not transferred into the united lamp 22, connector 24, and wire 23. The external force is transferred only into end portion "C" of the wire 23 enclosed within the lamp holder 25 and not into portion "E" located between the wire 23 and the connector 24.

Because no external force is transferred into an area where the lamp 22 is connected to the wire 23 via the connector 24, the wire 23 will not break. Also, the connector 24 may be electrically connected to the lamp electrode 32 and the wire electrode 33 using a machine, thereby simplifying assembly of the lamp apparatus. Furthermore, since the solder 4 and the shrinking tube 10 are not used, a material cost can be reduced.

As described above, according to the present invention, the lamp electrode and the wire electrode are pressed and inserted into the connector and are thereby electrically connected to each other. A lamp holder is subsequently formed to enclose and unify the lamp, the connector, and the wire to prevent a breakage of the wire caused by external impacts. Moreover, since solder is not required, assembly efficiency is improved and air pollution caused by the solder is reduced to provide environmental benefits.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of forming a lamp apparatus for a liquid crystal display comprising:
   providing a liquid crystal display comprising a lamp, the lamp being capable of generating light in response to an external voltage applied to an electrode of the lamp;
   providing a wire capable of delivering the external voltage;
   electrically connecting the lamp and the wire by directly contacting only the electrode of the lamp and a wire electrode provided at the end portion of the wire to a connector, the connector having a plurality of curved wings wherein said curved wings in substantially the same direction;
   providing a lamp holder into which an end of the lamp, the electrode of the lamp, the connector, the wire electrode, and the end portion of the wire are substantially disposed, wherein the lamp holder comprises an injection molded product, wherein material of the injection molded product is molded around the connector so as to be in direct contact with the entire surface of the connector, wherein the electrode of the lamp is connected to the one end portion of the connector, wherein the wire electrode of the wire is connected to the other end portion of the connector, and wherein the material of the injection molded product is molded around the end portion of the wire so as to be in direct contact with the end portion of the wire; and
   encasingly enclosing the end of the lamp, the electrode of the lamp, the connector, the wire electrode, and the end portion of the wire such that an external force is transferred into an the end portion of the wire thus preventing wire breakage.

2. The method of forming the lamp apparatus according to claim 1, wherein the connector comprises:
   a first curved wing directly contacting only around the electrode of the lamp; and
   a second curved wing directly contacting only around the wire electrode.

3. The method of forming the lamp apparatus according to claim 2, wherein the first curved wing is at least partially surrounding the electrode of the lamp and the second curved wing is at least partially surrounding only around the wire electrode.

* * * * *